United States Patent [19]

Chakravarti et al.

[11] Patent Number: 4,925,638

[45] Date of Patent: May 15, 1990

[54] THERMOWELL ASSEMBLY FOR A VESSEL

[75] Inventors: Bhaven Chakravarti, Bloomfield; Thomas W. Johnson, Kearny, both of N.J.

[73] Assignee: Lummus Crest Inc., Bloomfield, N.J.

[21] Appl. No.: 644,994

[22] Filed: Aug. 28, 1984

[51] Int. Cl.$^5$ .............................................. G01K 13/02
[52] U.S. Cl. .................................. 422/310; 136/230; 374/179; 374/208
[58] Field of Search ................. 422/119, 130, 49, 310, 422/109; 374/110, 173, 208, 179; 136/239

[56] References Cited

U.S. PATENT DOCUMENTS 4,028,139  6/1977  Smith et al. .......................... 374/110
4,376,227  3/1983  Hilborn ................................ 136/242

Primary Examiner—Barry S. Richman
Assistant Examiner—Jill Johnston
Attorney, Agent, or Firm—Louis E. Marn

[57] ABSTRACT

A thermowell assembly consists of an elongated tube member including a channel and having a plurality of arm members disposed at diverse lengths and extending into the channel of the tube member. Thermocouple guide tubes including passageways for receiving a thermocouple are disposed in the channel of the elongated tube member with a terminal end portion of each thermocouple guide tube being mounted to respective arm members.

4 Claims, 1 Drawing Sheet

THERMOWELL ASSEMBLY FOR A VESSEL

FIELD OF THE INVENTION

This invention relates to an improved thermowell assembly, and more particularly to an improved thermowell assembly for a vessel, such as a reaction vessel.

BACKGROUND OF THE INVENTION

In U.S. Pat. No. 2,987,465 to Johnson, there is disclosed a reaction system between liquids, solids and gases in a so-called "ebullated bed" in a reaction vessel in which gases and liquids flow upwardly through a reaction zone under conditions which tend to place the contact particles in random motion. It has been found that nearly isothermal conditions result when the catalyst or contact bed is expanded at least 10%, and generally not more than 300%. It is also found that the random motion of the particles in the liquid avoids attrition and permits such control that substantially no solids are carried out of the reaction zone. In each ebullated system, variables which may be adjusted to attain the desired ebullation (random motion of the particles in the liquid) include the flow rate, density and viscosity of the liquid and the gasiform material, and the size, shape and density of the particulate material.

In such a reaction system, it is important to monitor the reaction temperatures, since conversion rates, as known to one skilled in the art, are directly proportional to reaction temperature, and in such reaction system is one important parameter of product distribution.

Thermowell assemblies, presently in use, present difficulties in inspection of the thermocouples for accuracy as well as troubleshooting, thereby reducing reliability of recorded temperature measurements. Individual thermocouples cannot be replaced during onstream use of a vessel effecting a unit process or unit operation. Additionally, replacement of such thermocouples requires removal and replacement of the full assembly, particularly in the event of a large number of thermocouple failures. Still further, thermowell designs generally were configured with a bend in the well requiring sectioning (i.e. cutting up) before removal.

OBJECTS OF THE INVENTION

An object of the present invention is to provide an improved thermowell assembly.

Another object of the present invention is to provide an improved thermowell assembly for a vessel, such as a reaction vessel.

Still another object of the present invention is to provide an improved thermowell assembly permitting of facile thermocouple replacement within such thermowell assembly.

A still further object of the present invention is to provide an improved thermowell assembly permitting of facile thermocouple replacement within such thermowell assembly without replacement of the thermowell assembly Yet another object of the present invention is to provide an improved thermowell assembly permitting of facile thermocouple replacement during onstream usage of a vessel provided with such improved thermowell assembly.

SUMMARY OF THE INVENTION

These and other objects of the present invention are achieved by a thermowell assembly comprised of an elongated tube member including a channel and having a plurality of arm members disposed at diverse lengths thereof extending into the channel of the tube member and wherein a plurality of thermocouple guide tubes including passageways for receiving a thermocouple are disposed in the channel of the elongated tube member with a terminal end portion of each thermocouple guide tube being mounted to respective arm members.

BRIEF DESCRIPTION OF THE DRAWING

A better understanding of the present invention, as well as other objects and advantages thereof, will become apparent upon consideration of the detailed disclosure thereof, especially when taken with the accompanying drawing, wherein.

DETAILED DESCRIPTION OF THE INVENTION

Figure 1:
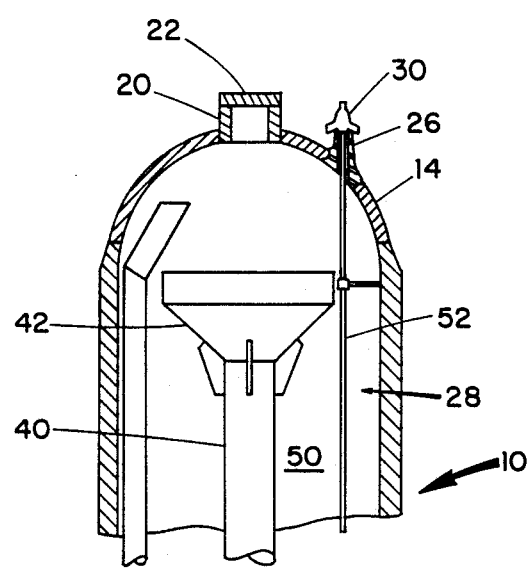
FIG. 1 is a schematic cross-sectional elevational view of a reaction vessel employing a thermowell assembly of the present invention.
Figure 1:
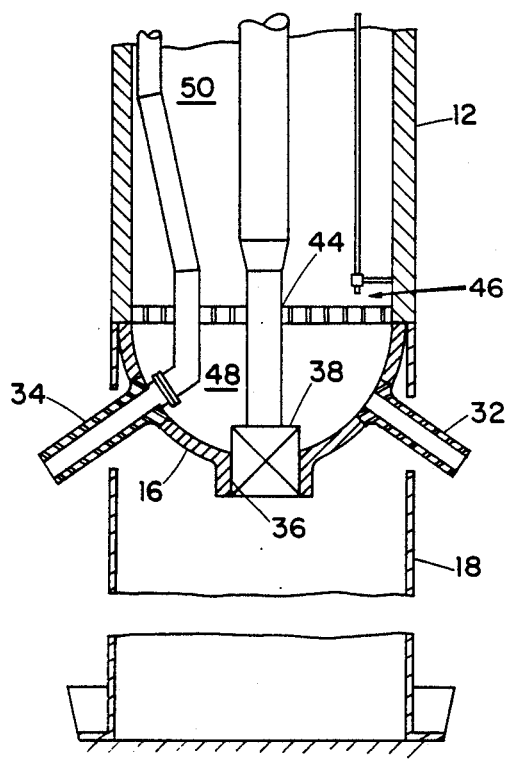

Referring now to FIG. 1, there is illustrated a reaction vessel, generally indicated as 10, of the type for effecting high pressure reactions in an ebullated bed. The reaction vessel 10 is comprised of a cylindrically-shaped side wall 12 enclosed by a hemispherically-shaped top head 14 and a hemispherically-shaped bottom head 16 mounted on a cylindrically-shaped skirt member 18.

The reaction vessel 10 is a thick-walled vessel adapted for a liquid-solids-gaseous contact, as for example, the hydrogenation of hydrocarbons in the presence of catalyst in which the pressures are usually in the range of 1000 to 5000 p.s.i.g., and in which the temperatures are usually in the range of 750° F. to 850° F. It will be understood, however, that the invention may be provided in any vessel for any unit process or unit operation, particularly for vessels in which gaseous contact processes are effected at temperatures of very wide ranges.

The top head 14 of the reaction vessel 10 is provided with a manhole opening 20 enclosed by a manhole cover 22, a solids inlet 24 and with at least one conduit 26 for positioning at least one thermowell assembly, generally indicated as 28, positioned within the conduit 26 enclosed by a cap 30 member. The bottom head 16 is provided with a feed inlet conduit 32, a reaction effluent outlet conduit 34 and a centrally-disposed opening 36 for a recycle pump assembly, generally indicated as 38.

Coaxially-disposed within the reaction vessel 10, there is provided an elongated downcomer tube 40 including a conically-shaped upper portion 42 and a lower recycle distribution conduit assembly 44. In a lower portion of the reaction vessel 10 there is transversely mounted a disc-shaped distribution grid assembly, generally indicated as 46, including fluid-gaseous mixing devices (not shown), such as bubble cap assemblies, such as described in the U.S. Pat. No. 3,475,134 to Weber et al. The distribution grid assembly 46 divides the reaction vessel 10 into a lower plenum chamber 48 and an upper chamber 50 primarily functioning as a reaction zone.

Figure 3:
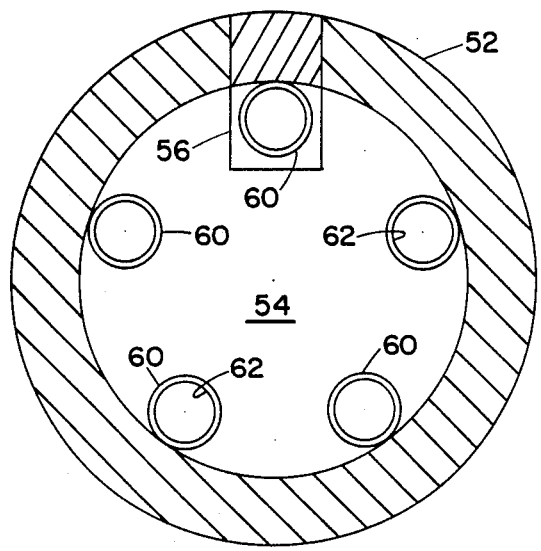
FIG. 3 is a cross-sectional view taken along the lines 3—3 of FIG. 2.
Figure 2:
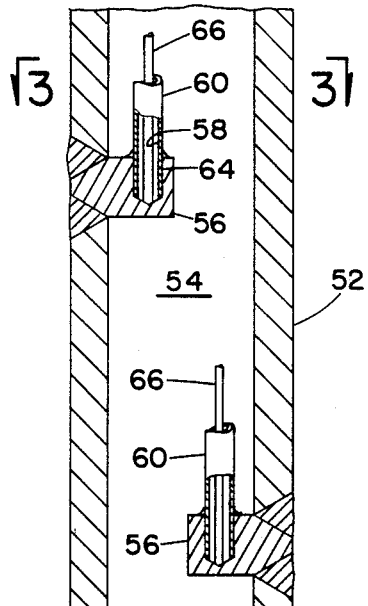
FIG. 2 is an enlarged partial cross-sectional view of a thermowell assembly of the present invention.

The thermowell assembly 28, referring particularly to FIGS. 2 and 3, is comprised of an elongated tube member 52 defining a channel 54 and having a plurality of arm members 56 mounted, such as by welding, to the tube member 52. The arm members 56 extend inwardly into the channel 54 and are disposed at a plurality of longitudinal positions therein. The arm members 56 are formed with a cavity 58 in an end portion thereof extending into the channel 54. A plurality of thermocouple guide tubes 60 including passageways 62 of diverse length are positioned within the channel 54 of the tube member 52 with terminal end portions 64 thereof disposed within the cavity 58 of each arm member 54 and mounted therein, such as by welding.

Each thermocouple guide tube 60 is provided with a thermocouple 66 disposed within the passageway 62 therein. Generally, the temperature sensing juncture of each thermocouple is positioned proximate the terminal end portion 64 of the thermocouple guide tube 60 to thereby more closely correlate temperature sensing to thermocouple positioning within the reaction vessel 10.

Figure 4:
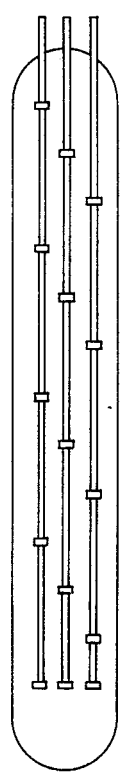
FIG. 4 is a schematic elevational view of the positioning of thermocouples within each thermowell assembly within such a reaction vessel.

FIG. 4 schematically illustrates positioning (by the squares) of thermocouple junctions corresponding to the arm members 56 disposed within the channel 54 of each tube member 52 constituting a thermowell assembly 28.

The thermowell assembly 28 of the present invention is readily assembled by forming a plurality of orifices in the tube member 52 corresponding to preselect positioning of thermocouples 66 within the tube member 52. The terminal end portion 64 of a thermocouple guide tube 60 is mounted within cavity 58 of an arm member 56. The thermocouple guide tube 60 including the arm member 56 is inserted into the tube member 52 to a point at which the arm member 56 corresponds to an appropriate orifice whereupon the arm member 56 is mounted, such as by welding, to the tube member 52.

The thermowell assembly 28 of the present invention permits facile replacement of a faulty thermocouple 66 without process shut-down of the vessel 10 by removal of a junction box (not shown) situated above the cap 30 with subsequent withdrawal of the faulty thermocouple followed by insertion of a replacement thermocouple 66.

While the invention has been described in connection with a preferred embodiment thereof, it will be understood that many modifications will be apparent to those of ordinary skill in the art; and that this application is intended to cover any adaptation or variation thereof. Therefore, it is manifestly intended that the invention be only limited by the claims and the equivalents thereof.

What is claimed is:

1. A thermowell assembly for positioning a plurality of thermocouples at diverse longitudinal positions thereof, which comprises:
    an elongated tube member including a channel;
    a plurality of arm members mounted to said tube member and extending into said channel of said tube member, each of said arm members being formed with a cavity to receive a terminal end portion of a thermocouple guide tube; and
    a plurality of thermocouple guide tubes including a passageway disposed within said channel of said elongated tube, each of said guide tubes being mounted to a respective arm member, each of said passageways of a thermocouple guide tube capable of receiving a thermocouple.

2. The thermowell assembly as defined in claim 1 wherein said arm members are radially positioned within said channel of said tube member.

3. The thermowell assembly as defined in claim 2 wherein said arm members are spaced apart along a length of said channel of said tube member.

4. The thermowell assembly as defined in claim 1 and further including a thermocouple disposed in each passageway of said guide tubes.

* * * * *